(12) United States Patent
Ishii

(10) Patent No.: US 9,663,844 B2
(45) Date of Patent: May 30, 2017

US009663844B2

(54) SINTERED ALLOY SUPERIOR IN WEAR RESISTANCE

(71) Applicant: Diamet Corporation, Niigata-shi (JP)

(72) Inventor: Yoshinari Ishii, Niigata (JP)

(73) Assignee: DIAMET CORPORATION, Niigata (JP)

( * ) Notice: Subject to any disclaimer, the term of this patent is extended or adjusted under 35 U.S.C. 154(b) by 290 days.

(21) Appl. No.: 14/372,357

(22) PCT Filed: Feb. 21, 2013

(86) PCT No.: PCT/JP2013/054314
§ 371 (c)(1),
(2) Date: Jul. 15, 2014

(87) PCT Pub. No.: WO2013/129226
PCT Pub. Date: Sep. 6, 2013

(65) Prior Publication Data
US 2014/0352495 A1  Dec. 4, 2014

(30) Foreign Application Priority Data
Feb. 29, 2012  (JP) .................. 2012-044165

(51) Int. Cl.
| | | |
|---|---|---|
| *C22C 9/00* | (2006.01) | |
| *C22C 1/04* | (2006.01) | |
| *C22C 9/02* | (2006.01) | |
| *C22C 9/04* | (2006.01) | |
| *C22C 9/06* | (2006.01) | |
| *C22C 19/03* | (2006.01) | |
| *C22C 1/05* | (2006.01) | |
| *C22C 1/10* | (2006.01) | |
| *C22C 30/02* | (2006.01) | |
| *C22C 30/06* | (2006.01) | |
| *C22C 32/00* | (2006.01) | |
| *C22C 38/00* | (2006.01) | |
| *C22C 38/16* | (2006.01) | |
| *F16C 33/12* | (2006.01) | |
| *B22F 1/00* | (2006.01) | |

(52) U.S. Cl.
CPC ............. *C22C 1/0425* (2013.01); *C22C 1/05* (2013.01); *C22C 1/10* (2013.01); *C22C 9/00* (2013.01); *C22C 9/02* (2013.01); *C22C 9/04* (2013.01); *C22C 9/06* (2013.01); *C22C 19/03* (2013.01); *C22C 30/02* (2013.01); *C22C 30/06* (2013.01); *C22C 32/0089* (2013.01); *C22C 38/002* (2013.01); *C22C 38/004* (2013.01); *C22C 38/008* (2013.01); *C22C 38/16* (2013.01); *F16C 33/121* (2013.01); *B22F 1/0059* (2013.01)

(58) Field of Classification Search
None
See application file for complete search history.

(56) References Cited

U.S. PATENT DOCUMENTS

| | | | | |
|---|---|---|---|---|
| 6,165,246 A | * | 12/2000 | Kira .......................... | C22C 9/00 428/545 |
| 2003/0099853 A1 | | 5/2003 | Takayama et al. | |
| 2003/0209103 A1 | | 11/2003 | Takayama et al. | |
| 2007/0258668 A1 | * | 11/2007 | Shimizu .................... | C22C 9/02 384/28 |

FOREIGN PATENT DOCUMENTS

| | | |
|---|---|---|
| CN | 1379192 A | 11/2002 |
| EP | 0962541 A | 12/1999 |
| EP | 1808503 A | 7/2007 |
| EP | 2048253 A | 4/2009 |
| GB | 2250550 A | 6/1992 |
| JP | 58-019413 A | 2/1983 |
| JP | 02-125829 A | 5/1990 |
| JP | 04-198440 A | 7/1992 |
| JP | 05-195117 A | 8/1993 |
| JP | 10-009294 A | 1/1998 |
| JP | 2002-180163 A | 6/2002 |
| JP | 2002-285266 A | 10/2002 |
| JP | 2003-269456 A | 9/2003 |
| JP | 2003-342700 A | 12/2003 |
| JP | 2005-133736 A | 5/2005 |
| JP | 2010-031373 A | 2/2010 |
| WO | WO-2006/022337 A | 3/2006 |
| WO | WO-2008/018348 A | 2/2008 |
| WO | WO-2010/147139 A | 12/2010 |

OTHER PUBLICATIONS

Office Action mailed Jan. 5, 2016 for the corresponding Japanese Patent Application No. 2014-502162.
Office Action mailed Feb. 14, 2016 for the corresponding Chinese Patent Application No. 201380004679.5.
Office Action mailed Jul. 29, 2015 for the corresponding Chinese Application No. 201380004679.5.
Extended European Search Report mailed Aug. 24, 2015 for the corresponding European Application No. 13755528.0.

(Continued)

*Primary Examiner* — Jessee Roe
*Assistant Examiner* — Ngoclan T Mai
(74) *Attorney, Agent, or Firm* — Leason Ellis LLP

(57) ABSTRACT

A sintered bearing has a structure in which Ni—P alloy particles having an average diameter of 10 to 100 μm are dispersed in an amount of 1 to 20% by mass in a Cu-based sintered alloy base, a Fe—Cu-based sintered alloy base or a Cu—Ni-based sintered alloy base. The Ni—P alloy particles are derived from a raw material powder comprising 1 to 12% by mass of P; and a remainder composed of Ni and inevitable impurities. The Cu-based sintered alloy base contains no less than 40% by mass of Cu. The Fe—Cu-based sintered alloy base contains no more than 50% by mass of Fe. The Cu—Ni-based sintered alloy base contains 20 to 40% by mass of Ni and 0.1 to 1.0% by mass of P; or contains 10 to 25% by mass of Ni, 10 to 25% by mass of Zn and 0.1 to 1.0% by mass of P.

19 Claims, No Drawings

(56) References Cited

OTHER PUBLICATIONS

Extended European Search Report mailed Aug. 6, 2015 for the corresponding European Application No. 15164627.0.
Extended European Search Report mailed Aug. 6, 2015 for the corresponding European Application No. 15164626.2.
European Search Report mailed Mar. 25, 2015 for the corresponding European Application No. 13755528.0.
International Search Report mailed May 21, 2013 for the corresponding PCT Application No. PCT/JP2013/054314.
Office Action dated Jul. 4, 2016 for the corresponding Chinese Patent Application No. 201380004679.5.

* cited by examiner

SINTERED ALLOY SUPERIOR IN WEAR RESISTANCE

CROSS-REFERENCE TO RELATED PATENT APPLICATIONS

This application is a U.S. National Phase Application under 35 U.S.C. §371 of International Patent Application No. PCT/JP2013/054314, filed Feb. 21, 2013, and claims the benefit of Japanese Patent Application No. 2012-044165, filed on Feb. 29, 2012, all of which are incorporated by reference in their entirety herein. The International Application was published in Japanese on Sep. 6, 2013 as International Publication No. WO/2013/129226, under PCT Article 21(2).

FIELD OF THE INVENTION

The present invention relates to a sintered alloy that is used to produce a sintered bearing and is superior in a wear resistance.

BACKGROUND OF THE INVENTION

As a type of bearing that is simple and superior in quietness and economic efficiency, a sintered bearing has conventionally been used in various motors of, for example, automobiles and household electrical appliances. However, in recent years, due to the improved performances or downsizing of the motors, it is required that a sintered bearing possess a higher wear resistance and durability than those of the conventional ones, which is particularly noticeable in the case of electric motors for automobiles.

Problem to be Solved by the Invention

Although various studies have been conducted on, for example, alloy compositions, base-hardening treatments and combinations with solid lubricants for the purpose of improving the durability of a sintered bearing, no satisfactory effect has so far been confirmed.

For example, a Cu-based sintered alloy disclosed in the Japanese Unexamined Patent Application Publication No. Hei 05-195117 possesses a wear resistance and a seize resistance due to the fact that Ni-based hard particles with a preferable adhesiveness to a base and $MoS_2$ as a solid lubricant are added to a Cu—Ni—Sn-based alloy hardenable through spinodal decomposition. However, the problem in terms of cost is that this Cu-based sintered alloy cannot be inexpensively produced, since the Ni-based hard particles used to produce the same are expensive. In addition, the problem in terms of production is that there cannot be stably obtained a product with a superior wear resistance and a seize resistance, since the Ni-based hard particles used to produce the Cu-based sintered alloy contain Cr; and since the adhesiveness of the Ni-based hard particles to the base may thus not always be sufficient at the time of performing atmosphere sintering in a continuous furnace superior in mass productivity.

Here, it is an object of the present invention to provide a novel sintered bearing superior to the conventional ones in a wear resistance.

SUMMARY OF THE INVENTION

Means to Solve the Problem

As a sliding material, the inventor of the present invention focused on a Ni—P alloy with a high wear resistance. The results of the diligent studies conducted by the inventor indicate that Ni—P alloy particles can be dispersed in a sintered alloy by adding a Ni—P alloy powder to a raw material powder of the sintered alloy such that the Ni—P alloy powder is to be dispersed in the raw material powder when mixed together; performing powder compacting on a mixed powder thus prepared; and then performing sintering at a temperature not higher than a temperature near a melting point of the Ni—P alloy. Further, the inventor also found that an adhesiveness of the Ni—P alloy particles to a base of the sintered alloy could be improved by optimizing sintering conditions; and thus allowing a reaction to appropriately take place between the Cu component or the Ni component in the sintered alloy and the surfaces of the Ni—P alloy particles. Furthermore, the inventor found that the wear resistance could be improved by dispersing in the base of the sintered alloy the Ni—P alloy particles of an average diameter of 10 to 100 μm in an amount of 1 to 20% by mass, the Ni—P alloy particles being derived from a raw material powder containing P in an amount of 1 to 12% by mass; and a remainder composed of Ni and inevitable impurities.

That is, a Cu-based sintered alloy of the present invention has a structure in which Ni—P alloy particles having an average diameter of 10 to 100 μm are dispersed in an amount of 1 to 20% by mass in a Cu-based sintered alloy base that contains no less than 40% by mass of Cu and selectively contains 0.2 to 8% by mass of a solid lubricant. Particularly, the Ni—P alloy particles are derived from a raw material powder comprising 1 to 12% by mass of P; and a remainder composed of Ni and inevitable impurities.

A Fe—Cu-based sintered alloy of the present invention has a structure in which Ni—P alloy particles having an average diameter of 10 to 100 μm are dispersed in an amount of 1 to 20% by mass in a Fe—Cu-based sintered alloy base that contains no more than 50% by mass of Fe and selectively contains 0.2 to 8% by mass of a solid lubricant. Particularly, the Ni—P alloy particles are derived from a raw material powder comprising 1 to 12% by mass of P; and a remainder composed of Ni and inevitable impurities.

A Cu—Ni-based sintered alloy of the present invention has a structure in which Ni—P alloy particles having an average diameter of 10 to 100 μm are dispersed in an amount of 1 to 20% by mass in a Cu—Ni-based sintered alloy base that contains 20 to 40% by mass of Ni, 0.1 to 1.0% by mass of P and a remainder composed of Cu and inevitable impurities and selectively contains 0.2 to 8% by mass of a solid lubricant; or a structure in which Ni—P alloy particles having an average diameter of 10 to 100 μm are dispersed in an amount of 1 to 20% by mass in a Cu—Ni-based sintered alloy base that contains 10 to 25% by mass of Ni, 10 to 25% by mass of Zn, 0.1 to 1.0% by mass of P and a remainder composed of Cu and inevitable impurities and selectively contains 0.2 to 8% by mass of a solid lubricant. Particularly, the Ni—P alloy particles are derived from a raw material powder comprising 1 to 12% by mass of P; and a remainder composed of Ni and inevitable impurities.

Effects of the Invention

Each of the Cu-based sintered alloy, Fe—Cu-based sintered alloy and Cu—Ni-based sintered alloy of the present invention has the structure in which the Ni—P alloy particles of the average diameter of 10 to 100 μm are dispersed in the amount of 1 to 20% by mass in the base of the sintered alloy, and the Ni—P alloy particles are derived from the raw material powder containing P in the amount of 1 to 12% by mass; and the remainder composed of Ni and inevitable impurities. Therefore, the Cu-based sintered alloy, Fe—Cu-based sintered alloy and Cu—Ni-based sintered alloy of the present invention are superior in wear resistance.

DETAILED DESCRIPTION OF THE INVENTION

BEST MODE FOR CARRYING OUT THE INVENTION

A Cu-based sintered alloy of the present invention has a structure where Ni—P alloy particles of an average diameter of 10 to 100 μm are dispersed in an amount of 1 to 20% by mass in a Cu-based sintered alloy base that contains Cu in an amount of no less than 40% by mass and selectively contains a solid lubricant in an amount of 0.2 to 8% by mass. Particularly, the Ni—P alloy particles are derived from a raw material powder containing P in an amount of 1 to 12% by mass; and a remainder composed of Ni and inevitable impurities.

The Cu-based sintered alloy base may contain Sn in an amount of 5 to 15% by mass and a remainder composed of Cu and inevitable impurities; Sn in the amount of 5 to 15% by mass, P in an amount of 0.1 to 1.0% by mass and the remainder composed of Cu and inevitable impurities; Sn in an amount of 3 to 13% by mass, Zn in an amount of 2 to 12% by mass and the remainder composed of Cu and inevitable impurities; Sn in the amount of 1 to 15% by mass, Fe in an amount of 8 to 30% by mass and the remainder composed of Cu and inevitable impurities; or Sn in the amount of 1 to 15% by mass, Fe in the amount of 8 to 30% by mass, P in the amount of 0.1 to 1.0% by mass and the remainder composed of Cu and inevitable impurities.

The solid lubricant may be at least any one of graphite, molybdenum disulfide, boron nitride and calcium fluoride.

An Fe—Cu-based sintered alloy of the preset invention has a structure where Ni—P alloy particles of the average diameter of 10 to 100 μm are dispersed in the amount of 1 to 20% by mass in a Fe—Cu-based sintered alloy base that contains Fe in an amount of no more than 50% by mass and selectively contains a solid lubricant in the amount of 0.2 to 8% by mass. Particularly, the Ni—P alloy particles are derived from a raw material powder containing P in the amount of 1 to 12% by mass; and a remainder composed of Ni and inevitable impurities.

The Fe—Cu-based sintered alloy base may contain Sn in an amount of 0.5 to 5% by mass and a remainder composed of Cu and inevitable impurities; Sn in the amount of 0.5 to 5% by mass, P in the amount of 0.1 to 1.0% by mass and the remainder composed of Cu and inevitable impurities; Sn in the amount of 0.5 to 5% by mass, Zn in the amount of 0.5 to 5% by mass and the remainder composed of Cu and inevitable impurities; or Sn in the amount of 0.5 to 5% by mass, Zn in the amount of 0.5 to 5% by mass, P in the amount of 0.1 to 1.0% by mass and the remainder composed of Cu and inevitable impurities.

The solid lubricant may be at least any one of graphite, molybdenum disulfide, boron nitride and calcium fluoride.

A Cu—Ni-based sintered alloy of the present invention has a structure where Ni—P alloy particles of the average diameter of 10 to 100 μm are dispersed in the amount of 1 to 20% by mass in a Cu—Ni-based sintered alloy base that contains Ni in an amount of 20 to 40% by mass, P in the amount of 0.1 to 1.0% by mass and a remainder composed of Cu and inevitable impurities and selectively contains a solid lubricant in the amount of 0.2 to 8% by mass; or a structure where Ni—P alloy particles of the average diameter of 10 to 100 μm are dispersed in the amount of 1 to 20% by mass in a Cu—Ni-based sintered alloy base that contains Ni in an amount of 10 to 25% by mass, Zn in the amount of 10 to 25% by mass, Pin the amount of 0.1 to 1.0% by mass and a remainder composed of Cu and inevitable impurities and selectively contains a solid lubricant in the amount of 0.2 to 8% by mass. Particularly, the Ni—P alloy particles are derived from a raw material powder containing P in the amount of 1 to 12% by mass; and a remainder composed of Ni and inevitable impurities.

The solid lubricant may be at least any one of graphite, molybdenum disulfide, boron nitride and calcium fluoride.

The Cu-based sintered alloy, Fe—Cu-based sintered alloy and Cu—Ni-based sintered alloy of the present invention improve a wear resistance by allowing the Ni—P alloy particles to be dispersed in the metal structures thereof. The Ni—P alloy particles are described in detail hereunder.

(1) P Content of Ni—P Alloy Particle Component: 1 to 12% by Mass

The closer an ingredient amount of P is to that of an $Ni_3P$ phase (15% P), the harder the Ni—P alloy particles are. Such Ni—P alloy particles contribute to an improvement in wear resistance of a sintered bearing when dispersed in the sintered alloys. However, the Ni—P alloy particles have a property where the closer the ingredient amount of P is to that of the $Ni_3P$ phase (15% P), the more brittle they become; and a less ingredient amount of P results in a decreased hardness. Hard and brittle Ni—P alloy particles can easily fall off the sintered alloys sliding along a shaft as a counterpart, thus actually leading to a significant wear. Meanwhile, a less ingredient amount of P results in a decreased hardness of the Ni—P alloy particles. This is not preferable because, in such case, the Ni—P alloy particles contribute less to improving the wear resistance even when dispersed in the sintered alloys. Therefore, the P content of the Ni—P alloy particles was set to be 1 to 12%.

(2) Particle Diameter of Ni—P Alloy Particle: Average Particle Diameter of 10 to 100 μm A size control needs to be performed on a Ni—P alloy powder for the purpose of satisfying both the hardness of the Ni—P alloy particles and an adhesiveness of the same to the bases, the Ni—P alloy particles being dispersed in the bases of the sintered alloys. When the average particle diameter of the Ni—P alloy particles is smaller than 10 μm, it is difficult to control a reaction between the Ni—P alloy particles and the bases of the sintered alloys that takes place through sintering. This is not preferable because, in such case, P in the Ni—P alloy particles diffuses into the bases of the sintered alloys, thus causing the hardness and wear resistance of the Ni—P alloy particles to decrease. Further, when the average particle diameter of the Ni—P alloy particles is no less than 100 μm, relatively less particles exist on a bearing bore surface. This is not preferable because, in such case, the wear resistance is decreased. Therefore, the average particle diameter of the Ni—P alloy particles was set to be 10 to 100 μm.

Here, the average particle diameter refers to a particle diameter that is measured using a laser diffraction particle size analyzer and expressed as a volume average particle diameter (Mv).

(3) Additive Amount of Ni—P Alloy Particle: 1 to 20% by Mass

Although there can be brought about the effect of improving the wear resistance by allowing the Ni—P alloy particles to be dispersed in the bases of the sintered alloys, this effect is low when the amount of the Ni—P alloy particles is smaller than 1%; and this effect is not recognizable when the Ni—P alloy particles are added in an amount of larger than 20%, which adversely and unfavorably results in a higher raw material cost. Therefore, the additive amount of the Ni—P alloy particles was set to be 1 to 20%.

(4) Solid Lubricant: 0.2 to 8.0% by Mass when Contained

The solid lubricant brings about a superior lubricity to a bearing and thus contributes to improving the wear resistance thereof. The solid lubricant contains at least one of graphite, molybdenum disulfide, boron nitride and calcium fluoride.

Although the solid lubricant may be contained on an as-needed basis, there cannot be achieved the effect of improving the wear resistance if the solid lubricant contained is in an amount of smaller than 0.2%; and a significant decrease in strength occurs if the solid lubricant contained is in an amount of greater than 8%, both of which are not preferable.

The Cu-based sintered alloy, Fe—Cu-based sintered alloy and Cu—Ni-based sintered alloy of the present invention can be obtained by adding and mixing into the entire raw material powder of the solid lubricant-containing sintered alloys the Ni—P alloy powder, in the ratio of 1 to 20% by mass, that has the average diameter of 10 to 100 μm and contains P in the amount of 1 to 12% by mass and the remainder composed of Ni and inevitable impurities; performing powder compacting on a mixed powder thus prepared; and then sintering the same at a temperature not higher than a temperature near a melting point of the Ni—P alloy. For example, a melting point of a Ni-11% P alloy is 880° C., and the Ni—P particles will remain as particles in the structure without all being melted even if when sintered at a temperature comparatively higher than the melting point as long as a sintering time is as short as about 15 minutes. Thus, although it is preferred that the sintering temperature be not higher than the melting point of the Ni—P alloy, the sintering temperature does not strictly need to be the melting point of the Ni—P alloy or lower. That is, as long as the sintering time is short, the sintering temperature may be comparatively higher than the melting point of the Ni—P alloy. Here, although the melting point of Ni—P, when the P concentration is 11%, is also a eutectic point (880° C.), such melting point increases as the P concentration changes.

The sintered alloy thus obtained is a sintered alloy with the Ni—P alloy particles that are derived from the Ni—P alloy powder dispersed therein. Further, the adhesiveness of the Ni—P alloy particles to the bases of the sintered alloys can be improved by optimizing sintering conditions such that an appropriate reaction can take place between the Cu component or the Ni component in the sintered alloys and the surfaces of the Ni—P alloy particles.

Described hereunder are specific working examples of the Cu-based sintered alloy, Fe—Cu-based sintered alloy and Cu—Ni-based sintered alloy of the present invention. However, the present invention is not limited to the following working examples, but may employ various modified modes.

Working Example 1

(1) Producing Cu-based Sintered Alloy, Fe—Cu-based Sintered Alloy and Cu—Ni-Based Sintered Alloy As raw material powders, there were prepared a Ni-11% P alloy powder of an average particle diameter of 35 μm; an electrolytic Cu powder; an Sn powder; a Cu—Sn powder; a Cu—P powder; a Cu—Zn powder; a Fe powder; a Cu—Ni powder; and a solid lubricant such as a graphite powder. These raw material powders were then combined to one another in accordance with compositions shown in Table 1 when producing Cu-based sintered alloys; compositions shown in Table 2 when producing Fe—Cu-based sintered alloys; and compositions shown in Table 3 when producing Cu—Ni-based sintered alloys. Zinc stearate was then added to the raw material powders thus combined in an amount of 0.5% before mixing the same through a V-type mixer for 20 minutes. The powders thus mixed were then press-molded under a given pressure of a range of 200 to 700 MPa to produce a ring-shaped powder compact. The powder compact thus produced was then sintered in an endothermic gas (endothermic-type gas) atmosphere at a given temperature of a range of 670 to 800° C. when producing the Cu-based sintered alloys; a given temperature of a range of 750 to 920° C. when producing the Fe—Cu-based sintered alloys; and a given temperature of a range of 800 to 940° C. when producing the Cu—Ni-based sintered alloys, the endothermic gas atmosphere being generated by passing a mixture of a natural gas and air through a heated catalyst such that a decomposition and conversion reaction could take place. Sizing was then performed to obtain the Cu-based sintered alloys, the Fe—Cu-based sintered alloys and the Cu—Ni-based sintered alloys. Next, these sintered alloys were impregnated with a lubricating oil.

Through the aforementioned steps, produced were oil-impregnated bearings made of the Cu-based sintered alloys, Fe—Cu-based sintered alloys and Cu—Ni-based sintered alloys that have the compositions shown in Table 1 through Table 3, each oil-impregnated bearing being formed into the shape of a ring and a size of outer diameter: 18 mm×inner diameter: 8 mm×height: 4 mm.

In Table 1 through Table 3, sintered alloys within the scope of the present invention are referred to as "Invention examples," whereas those outside the scope of the present invention are referred to as "Comparative examples."

TABLE 1

| | | Cu-based sintered alloy | | | | | | | | |
|---|---|---|---|---|---|---|---|---|---|---|
| | | | Base composition (% by mass) | | | | | | Amount of Ni—P alloy powder added | Maximum worn depth of sintered |
| Category | No. | Cu | Sn | P | Zn | Fe | C | MoS$_2$ | (% by mass) | alloy(mm) |
| Invention example | 1 | Remainder | 9 | 0 | 0 | 0 | 0 | 0 | 10 | 0.012 |
| | 2 | Remainder | 10 | 0 | 0 | 0 | 1 | 0 | 8 | 0.012 |
| | 3 | Remainder | 9 | 0 | 0 | 0 | 4 | 0 | 5 | 0.008 |
| | 4 | Remainder | 9 | 0.2 | 0 | 0 | 7 | 0 | 2 | 0.004 |
| | 5 | Remainder | 5 | 0 | 10 | 0 | 0 | 0 | 18 | 0.010 |
| | 6 | Remainder | 5 | 0 | 10 | 0 | 7 | 0 | 4 | 0.007 |
| | 7 | Remainder | 9 | 0 | 3 | 0 | 0 | 0 | 10 | 0.009 |

TABLE 1-continued

Cu-based sintered alloy

| Category | No. | Base composition (% by mass) | | | | | | | Amount of Ni—P alloy powder added (% by mass) | Maximum worn depth of sintered alloy(mm) |
|---|---|---|---|---|---|---|---|---|---|---|
| | | Cu | Sn | P | Zn | Fe | C | MoS$_2$ | | |
| | 8 | Remainder | 9 | 0.4 | 0 | 0 | 0.5 | 3 | 5 | 0.004 |
| | 9 | Remainder | 10 | 0.4 | 0 | 0 | 0 | 0 | 12 | 0.010 |
| | 10 | Remainder | 11 | 0.4 | 0 | 0 | 1.5 | 0 | 10 | 0.005 |
| | 11 | Remainder | 11 | 0 | 0 | 10 | 0.7 | 0 | 10 | 0.007 |
| | 12 | Remainder | 9 | 0.4 | 0 | 10 | 0.5 | 0 | 8 | 0.009 |
| | 13 | Remainder | 3 | 0 | 0 | 27 | 0 | 0 | 5 | 0.007 |
| Comparative example | 1 | Remainder | 9 | 0 | 0 | 0 | 0 | 0 | 0 | 0.048 |
| | 2 | Remainder | 10 | 0 | 0 | 0 | 1 | 0 | 0 | 0.037 |
| | 3 | Remainder | 9 | 0 | 0 | 0 | 4 | 0 | 0.5 | 0.024 |
| | 4 | Remainder | 9 | 0.2 | 0 | 0 | 7 | 0 | 0 | 0.020 |
| | 5 | Remainder | 5 | 0 | 10 | 0 | 0 | 0 | 0 | 0.040 |
| | 6 | Remainder | 5 | 0 | 10 | 0 | 7 | 0 | 25 | 0.052 |
| | 7 | Remainder | 9 | 0 | 3 | 0 | 0 | 0 | 0 | 0.033 |
| | 8 | Remainder | 9 | 0.4 | 0 | 0 | 0.5 | 3 | 0 | 0.020 |
| | 9 | Remainder | 10 | 0.4 | 0 | 0 | 0 | 0 | 0 | 0.023 |
| | 10 | Remainder | 11 | 0.4 | 0 | 0 | 1.5 | 0 | 0 | 0.021 |
| | 11 | Remainder | 11 | 0 | 0 | 10 | 0.7 | 0 | 0 | 0.024 |
| | 12 | Remainder | 9 | 0.4 | 0 | 10 | 0.5 | 0 | 0 | 0.022 |
| | 13 | Remainder | 3 | 0 | 0 | 27 | 0 | 0 | 0 | 0.023 |

TABLE 2

Fe—Cu-based sintered alloy

| Category | No. | Base composition (% by mass) | | | | | | | Amount of Ni—P alloy powder added (% by mass) | Maximum worn depth of sintered alloy (mm) |
|---|---|---|---|---|---|---|---|---|---|---|
| | | Cu | Fe | Sn | P | Zn | C | MoS$_2$ | | |
| Invention example | 14 | Remainder | 48 | 2 | 0 | 0 | 0 | 0 | 7 | 0.008 |
| | 15 | Remainder | 48 | 2 | 0.3 | 0 | 0 | 0 | 10 | 0.003 |
| | 16 | Remainder | 48 | 2 | 0 | 2 | 0 | 0 | 15 | 0.004 |
| | 17 | Remainder | 48 | 2 | 0.4 | 2 | 0.5 | 0 | 8 | 0.006 |
| | 18 | Remainder | 74 | 1.5 | 0 | 0 | 0 | 0 | 5 | 0.003 |
| | 19 | Remainder | 77 | 1 | 0 | 0 | 2 | 0 | 2 | 0.002 |
| | 20 | Remainder | 83 | 1 | 0 | 0 | 1 | 0 | 3 | 0.002 |
| Comparative example | 14 | Remainder | 48 | 2 | 0 | 0 | 0 | 0 | 0 | 0.018 |
| | 15 | Remainder | 48 | 2 | 0.3 | 0 | 0 | 0 | 25 | 0.030 |
| | 16 | Remainder | 48 | 2 | 0 | 2 | 0 | 0 | 0 | 0.018 |
| | 17 | Remainder | 48 | 2 | 0.4 | 2 | 0.5 | 0 | 0 | 0.015 |
| | 18 | Remainder | 74 | 1.5 | 0 | 0 | 0 | 0 | 0.5 | 0.021 |
| | 19 | Remainder | 77 | 1 | 0 | 0 | 2 | 0 | 0 | 0.014 |
| | 20 | Remainder | 83 | 1 | 0 | 0 | 1 | 0 | 0 | 0.015 |

TABLE 3

Cu—Ni-based sintered alloy

| Category | No. | Base composition (% by mass) | | | | | Amount of Ni—P alloy powder added (% by mass) | Maximum worn depth of sintered alloy (mm) |
|---|---|---|---|---|---|---|---|---|
| | | Cu | Ni | P | Zn | C | | |
| Invention example | 21 | Remainder | 23 | 0.4 | 0 | 0 | 7 | 0.010 |
| | 22 | Remainder | 23 | 0.4 | 0 | 7 | 10 | 0.006 |
| | 23 | Remainder | 17 | 0.4 | 17 | 0 | 15 | 0.012 |
| | 24 | Remainder | 17 | 0.4 | 17 | 4 | 8 | 0.009 |
| Comparative example | 21 | Remainder | 23 | 0.4 | 0 | 0 | 0 | 0.023 |
| | 22 | Remainder | 23 | 0.4 | 0 | 7 | 25 | 0.018 |
| | 23 | Remainder | 17 | 0.4 | 17 | 0 | 0.5 | 0.037 |
| | 24 | Remainder | 17 | 0.4 | 17 | 4 | 0 | 0.029 |

(2) Wear Resistance Test

A wear resistance test was performed on the ring-shaped Cu-based sintered alloys, Fe—Cu-based sintered alloys and Cu—Ni-based sintered alloys (referred to as ring-shaped bearings hereunder) obtained. An S45C shaft was inserted into each ring-shaped bearing, and then rotated at a rate of 100 m/min for 200 hours while applying, from outside the ring-shaped bearing, a load of a bearing pressure of 1.5 MPa in a radial direction of the ring-shaped bearing (a direction orthogonal to an axial direction of the shaft). Later, a wear resistance was evaluated by measuring a maximum worn depth of a sliding surface of the ring-shaped bearing.

The results thereof are shown in Table 1 through Table 3.

The maximum worn depth of the ring-shaped bearing made of the Cu-based sintered alloy of each invention example was not lager than 0.015 mm; the maximum worn depth of the ring-shaped bearing made of the Fe—Cu-based sintered alloy of each invention example was not lager than 0.008 mm; and the maximum worn depth of the ring-shaped bearing made of the Cu—Ni-based sintered alloy of each invention example was not lager than 0.012 mm. That is, it was confirmed that the wear resistance of each sintered alloy had been improved by adding the Ni—P alloy particles. Further, it was also confirmed that the wear resistance tended to be higher when the solid lubricant had been added as compared to examples where no solid lubricant had been added.

In contrast, the maximum worn depth of the ring-shaped bearing made of the Cu-based sintered alloy of each comparative example was 0.020 to 0.048 mm; the maximum worn depth of the ring-shaped bearing made of the Fe—Cu-based sintered alloy of each comparative example was 0.015 to 0.030 mm; the maximum worn depth of the ring-shaped bearing made of the Cu—Ni-based sintered alloy of each comparative example was 0.018 to 0.037 mm. That is, wear resistances significantly lower than those of the invention examples were confirmed regardless of whether or not the solid lubricant had been added.

The invention claimed is:

1. A Cu-based sintered alloy having a structure in which Ni—P alloy particles having an average diameter of 10 to 100 μm are dispersed in an amount of 1 to 20% by mass in a Cu-based sintered alloy base that contains no less than 40% by mass of Cu and selectively contains 0.2 to 8% by mass of a solid lubricant, wherein said Ni—P alloy particles are derived from a raw material powder comprising 1 to 12% by mass of P; and a remainder composed of Ni and inevitable impurities.

2. The Cu-based sintered alloy according to claim 1, wherein said Cu-based sintered alloy base contains 5 to 15% by mass of Sn; and a remainder composed of Cu and inevitable impurities.

3. The Cu-based sintered alloy according to claim 1, wherein said Cu-based sintered alloy base contains 5 to 15% by mass of Sn; 0.1 to 1.0% by mass of P; and a remainder composed of Cu and inevitable impurities.

4. The Cu-based sintered alloy according to claim 1, wherein said Cu-based sintered alloy base contains 3 to 13% by mass of Sn; 2 to 12% by mass of Zn; and a remainder composed of Cu and inevitable impurities.

5. The Cu-based sintered alloy according to claim 1, wherein said Cu-based sintered alloy base contains 1 to 15% by mass of Sn; 8 to 30% by mass of Fe; and a remainder composed of Cu and inevitable impurities.

6. The Cu-based sintered alloy according to claim 1, wherein said Cu-based sintered alloy base contains 1 to 15% by mass of Sn; 8 to 30% by mass of Fe; 0.1 to 1.0% by mass of P; and a remainder composed of Cu and inevitable impurities.

7. The Cu-based sintered alloy according to claim 1, wherein said solid lubricant is at least any one selected from the group consisting of graphite, molybdenum disulfide, boron nitride and calcium fluoride.

8. A Fe—Cu-based sintered alloy having a structure in which Ni—P alloy particles having an average diameter of 10 to 100 μm are dispersed in an amount of 1 to 20% by mass in a Fe—Cu-based sintered alloy base that contains no larger than 50% by mass of Fe and selectively contains 0.2 to 8% by mass of a solid lubricant, wherein said Ni—P alloy particles are derived from a raw material powder comprising 1 to 12% by mass of P; and a remainder composed of Ni and inevitable impurities.

9. The Fe—Cu-based sintered alloy according to claim 8, wherein said Fe—Cu-based sintered alloy base contains 0.5 to 5% by mass of Sn; and a remainder composed of Cu and inevitable impurities.

10. The Fe—Cu-based sintered alloy according to claim 8, wherein said Fe—Cu-based sintered alloy base contains 0.5 to 5% by mass of Sn; 0.1 to 1.0% by mass of P; and a remainder composed of Cu and inevitable impurities.

11. The Fe—Cu-based sintered alloy according to claim 8, wherein said Fe—Cu-based sintered alloy base contains 0.5 to 5% by mass of Sn; 0.5 to 5% by mass of Zn; and a remainder composed of Cu and inevitable impurities.

12. The Fe—Cu-based sintered alloy according to claim 8, wherein said Fe—Cu-based sintered alloy base contains 0.5 to 5% by mass of Sn; 0.5 to 5% by mass of Zn; 0.1 to 1.0% by mass of P; and a remainder composed of Cu and inevitable impurities.

13. The Fe—Cu-based sintered alloy according to claim 8, wherein said solid lubricant is at least any one selected from the group consisting of graphite, molybdenum disulfide, boron nitride and calcium fluoride.

14. A Cu—Ni-based sintered alloy having a structure in which Ni—P alloy particles having an average diameter of 10 to 100 μm are dispersed in an amount of 1 to 20% by mass in a Cu—Ni-based sintered alloy base that contains 20 to 40% by mass of Ni, 0.1 to 1.0% by mass of P and a remainder composed of Cu and inevitable impurities; and selectively contains 0.2 to 8% by mass of a solid lubricant, wherein said Ni-P alloy particles are derived from a raw material powder comprising 1 to 12% by mass of P; and a remainder composed of Ni and inevitable impurities.

15. The Cu—Ni-based sintered alloy according to claim 14, wherein said solid lubricant is at least any one selected from the group consisting of graphite, molybdenum disulfide, boron nitride and calcium fluoride.

16. A Cu—Ni-based sintered alloy having a structure in which Ni—P alloy particles having an average diameter of 10 to 100 μm are dispersed in an amount of 1 to 20% by mass in a Cu—Ni-based sintered alloy base that contains 10 to 25% by mass of Ni, 10 to 25% by mass of Zn, 0.1 to 1.0% by mass of P and a remainder composed of Cu and inevitable impurities; and selectively contains 0.2 to 8% by mass of a solid lubricant, wherein said Ni—P alloy particles are derived from a raw material powder comprising 1 to 12% by mass of P; and a remainder composed of Ni and inevitable impurities.

17. The Cu—Ni-based sintered alloy according to claim 16, wherein said solid lubricant is at least any one selected from the group consisting of graphite, molybdenum disulfide, boron nitride and calcium fluoride.

18. An Fe—Cu-based sintered alloy having a structure in which Ni—P alloy particles having an average diameter of 10 to 100 μm are dispersed in an amount of 1 to 20% by mass in a Fe—Cu based sintered alloy base, wherein the Fe—Cu based sintered alloy base comprises 48 to 83% by mass of Fe and a remainder composed of Cu and inevitable impurities, and selectively comprises at least any one of;
5 to 5% by mass of Sn,
0.5 to 5% by mass of Zn,
0.1 to 1.0% by mass of P, and
0.2 to 8% by mass of a solid lubricant, and the Ni—P alloy particles are derived from a raw material powder comprising 1 to 12% by mass of P; and a remainder composed of Ni and inevitable impurities.

19. The Fe—Cu-based sintered alloy according to claim 18, wherein the solid lubricant is at least any one selected from the group consisting of graphite, molybdenum disulfide, boron nitride and calcium fluoride.

* * * * *